(12) United States Patent
Natarajan et al.

(10) Patent No.: US 9,505,929 B2
(45) Date of Patent: Nov. 29, 2016

(54) POLYCARBONATE-BASED THERMOPLASTIC RESIN COMPOSITION AND MOLDED ARTICLE

(71) Applicant: SAMSUNG SDI CO., LTD., Yongin-si (KR)

(72) Inventors: Senthilkumar Natarajan, Uiwang-si (KR); Joo Hyun Jang, Uiwang-si (KR); Dong Hee Kim, Uiwang-si (KR); Il Jin Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/763,877

(22) PCT Filed: Jun. 27, 2013

(86) PCT No.: PCT/KR2013/005727
§ 371 (c)(1),
(2) Date: Jul. 28, 2015

(87) PCT Pub. No.: WO2014/119827
PCT Pub. Date: Aug. 7, 2014

(65) Prior Publication Data
US 2015/0368462 A1     Dec. 24, 2015

(30) Foreign Application Priority Data

Jan. 29, 2013  (KR) .................. 10-2013-0009643
Jun. 25, 2013  (KR) .................. 10-2013-0072825

(51) Int. Cl.
*C08G 64/00* (2006.01)
*C08L 69/00* (2006.01)
*C08G 63/02* (2006.01)

(52) U.S. Cl.
CPC .................................... *C08L 69/00* (2013.01)

(58) Field of Classification Search
CPC .............................. C08G 64/307; C08G 64/06
USPC ................................................ 528/196, 198
See application file for complete search history.

(56) References Cited

U.S. PATENT DOCUMENTS

| 8,557,912 | B2 | 10/2013 | Chung et al. |
| 2005/0159546 | A1 | 7/2005 | Weber et al. |
| 2010/0160481 | A1 | 6/2010 | Shin et al. |
| 2011/0160377 | A1 | 6/2011 | Chung et al. |
| 2012/0129993 | A1 | 5/2012 | Ha et al. |

FOREIGN PATENT DOCUMENTS

| KR | 10-2010-0074018 A | 7/2010 |
| KR | 10-2010-0077663 A | 7/2010 |
| KR | 10-2011-0079489 A | 7/2011 |
| KR | 10-2012-0006839 A | 1/2012 |
| KR | 10-2012-0055277 A | 5/2012 |
| WO | 2014/119827 A9 | 8/2014 |

OTHER PUBLICATIONS

Office Action in counterpart Korean Application No. 10-2013-0072825 dated Oct. 7, 2015, pp. 1-6.
International Search Report in counterpart International Application No. PCT/KR2013/005727 dated Sep. 26, 2013, pp. 1-4.

*Primary Examiner* — Terressa Boykin
(74) *Attorney, Agent, or Firm* — Additon, Higgins & Pendleton, P.A.

(57) ABSTRACT

Disclosed is a polycarbonate-based thermoplastic composition comprising (A) a polycarbonate resin, (B) a rubber-modified acrylic graft copolymer resin and (C) a copolymer resin comprising a silicone-based compound. The polycarbonate based thermoplastic resin composition has superior fluidity without decrease of impact strength and heat resistance due to introduction of a copolymer comprising a silicone-based compound into a polycarbonate resin.

12 Claims, No Drawings

POLYCARBONATE-BASED THERMOPLASTIC RESIN COMPOSITION AND MOLDED ARTICLE

CROSS-REFERENCE TO RELATED APPLICATIONS

This application claims priority to and the benefit of International Application No. PCT/KR2013/005727, filed Jun. 27, 2013, which published as WO 2014/119827 on Aug. 7, 2014, Korean Patent Application No. 10-2013-0009643, filed in the Korean Intellectual Property Office on Jan. 29, 2013, and Korean Patent Application No. 10-2013-0072825, filed in the Korean Intellectual Property Office on Jun. 25, 2013, the entire disclosure of each of which is incorporated herein by reference.

TECHNICAL FIELD

The present invention relates to a polycarbonate based thermoplastic resin composition. More particularly, the present invention relates to a polycarbonate based thermoplastic resin composition having superior fluidity without decrease of impact strength and heat resistance.

BACKGROUND ART

Thermoplastic resins have a lower specific gravity than glass or metal and superior properties such as moldability and impact resistance. Plastic resins have been widely used in various products, such as electrical/electronic appliances and automobile components as a substitute for glass or metal in order to reduce costs, facilitate mass production and decrease weight. Accordingly, function as exterior materials and appearance of thermoplastic resins become important, and requirements for external impact and scratch resistance are increasing.

Polycarbonate based thermoplastic resins among thermoplastic resins have superior impact strength, heat resistance and transparency, and thus are used in a variety of engineering equipment.

However, polycarbonate based thermoplastic resins have relatively poor fluidity. Accordingly, in order to enhance fluidity of polycarbonate based thermoplastic resins, a mixture comprising one or more polymer and additives is used.

Conventionally, in order to enhance fluidity of polycarbonate based thermoplastic resins, a styrene-acrylonitrile (SAN) resin having a low molecular weight have been tried. However, fluidity was successfully enhanced, but impact strength and heat resistance were decreased.

In addition, in conventional PC/SAN alloy technology, g-ABS as an impact modifier was used. Since g-ABS has high affinity to SAN, g-ABS is present within SAN upon alloying PC/SAN (alloy), and, when external impact is applied, an interface between PC and SAN is firstly, mainly destroyed, thereby decreasing impact reinforcing effects. Accordingly, when g-ABS is used as an impact modifier, an interface between PC and SAN is firstly, mainly destroyed upon external impact.

Accordingly, the present inventors tried to enhance impact reinforcing effects by using a rubber-modified acrylic graft copolymer resin having affinity similar to PC and SAN. In addition, the present inventors tried to develop a polycarbonate based thermoplastic resin composition having enhanced moldability and processability due to superior fluidity, without decrease of mechanical properties such as impact strength and heat resistance.

DISCLOSURE

Technical Problem

Therefore, the present invention has been made in view of the above problems, and it is an object of the present invention to provide a polycarbonate based thermoplastic resin composition having superior fluidity.

It is another object of the present invention to provide a polycarbonate based thermoplastic resin composition having superior impact strength and heat resistance.

It is another object of the present invention to provide a polycarbonate based thermoplastic resin composition having superior moldability.

It is yet another object of the present invention to provide a molded article manufactured using the polycarbonate based thermoplastic resin composition.

The above and other objects can be accomplished by the present invention described below.

Technical Solution

In accordance with an aspect of the present invention, the above and other objects can be accomplished by the provision of a polycarbonate based thermoplastic resin composition comprising (A) a polycarbonate resin; (B) a rubber-modified acrylic graft copolymer resin; and (C) a copolymer resin comprising a silicone-based compound.

The polycarbonate based thermoplastic resin composition according to the present invention may comprise about 40 to about 80% by weight of the polycarbonate resin (A), about 1 to about 30% by weight of the rubber-modified acrylic graft copolymer resin (B) and about 10 to about 30% by weight of the copolymer resin comprising the silicone-based compound (C).

In addition, in another embodiment, the polycarbonate based thermoplastic resin composition according to the present invention may comprise a continuous-phase first resin, a dispersed-phase second resin, and an impact modifier located in an interface between the continuous-phase first resin and the dispersed-phase second resin.

The polycarbonate based thermoplastic resin composition according to the present invention may comprise about 40 to about 80% by weight of the continuous-phase first resin, about 10 to about 30% by weight of the dispersed-phase second resin and about 1 to about 30% by weight of the impact modifier.

The continuous-phase first resin may be a polycarbonate resin (A), the dispersed-phase second resin may be a copolymer resin comprising a silicone-based compound (C), and the impact modifier may be a rubber-modified acrylic graft copolymer resin (B).

The rubber-modified acrylic graft copolymer resin (B) may comprise 40 to 98% by weight of rubber (b1), about 1 to about 30% by weight of alkyl methacrylate (b2) and about 1 to about 40% by weight of a vinyl based aromatic monomer (b3).

The alkyl methacrylate (b2) may be $C_1$ to $C_{20}$ alkyl methacrylate.

The copolymer resin comprising the silicone-based compound (C) may be a branched vinyl-based copolymer resin.

The copolymer resin comprising the silicone-based compound (C) may be prepared by copolymerizing about 10 to about 80% by weight of an aromatic vinyl based monomer (c1), about 10 to about 80% by weight of an unsaturated nitrile based monomer (c2), about 1 to about 30% by weight of a (meth)acrylic monomer (c3) and about 0.1 to about 25% by weight of a silicone-based compound (c4) having two or more unsaturated reactive groups.

The copolymer resin comprising the silicone-based compound (C) may have a weight-average molecular weight of about 30,000 to about 800,000 g/mol.

The aromatic vinyl based monomer (c1) may be selected from the group consisting of styrene, p-methylstyrene, α-methylstyrene, halogen-substituted styrene, alkyl-substituted styrene and a combination thereof.

The unsaturated nitrile based monomer (c2) may be selected from the group consisting of acrylonitrile, methacrylonitrile, ethacrylonitrile, phenylacrylonitrile, α-chloroacrylonitrile and a combination thereof.

The (meth)acrylic monomer (c3) may be selected from the group consisting of methyl(meth)acrylate, ethyl(meth)acrylate, propyl(meth)acrylate, butyl(meth)acrylate, hexyl(meth)acrylate, 2-ethylhexyl(meth)acrylate and a combination thereof.

The silicone-based compound (c4) comprising the two or more unsaturated reactive groups may comprise one silicone-based compound type or a combination of two or more silicone-based compound types having a structure represented by Formula 4 below:

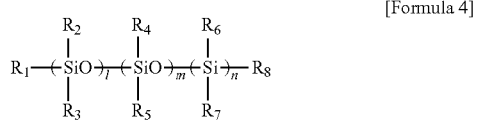

[Formula 4]

wherein l, m and n are each an integer of 0 to 100 (at least one of l, m and n is not 0), and $R_1$ to $R_8$ are each independently selected from the group consisting of hydrogen, linear or branched $C_1$-$C_5$ alkyl, $C_4$-$C_6$ cycloalkyl, unsaturated $C_2$-$C_{12}$ alkyl, $C_6$-$C_{10}$ aryl, a hydroxyl group, $C_1$-$C_5$ alkoxy, acetoxyl, amino, amide, epoxy, carboxyl, halogen, ester, isocyanate and mercapto, wherein at least two of the $R_1$ to $R_8$ comprises a polymerizable unsaturated reactive group.

The silicone-based compound (c4) comprising the two or more unsaturated reactive groups may have a viscosity of 5000 cPs or less and may comprise vinyl in an amount of about 0.05 to about 10 mmol/g.

The silicone-based compound (c4) comprising the two or more unsaturated reactive groups may be selected from the group consisting of 2,4,6,8-tetramethyl tetravinyl cyclotetrasiloxane, 1,3,5-trivinyl-1,1,3,5,5-pentamethyltrisiloxane, 2,4,6-trivinyl-1,3,5-trimethylcyclosilazane, polydimethylsiloxane, polyvinylmethylsilazane, 1,3-divinyl-1,1,3,3-tetramethyldisiloxane and a combination thereof.

In accordance with another aspect of the present invention, there is provided a molded article manufactured from the polycarbonate based thermoplastic resin composition.

Hereinafter, the present invention is described in detail below.

Advantageous Effects

As described above, a polycarbonate based thermoplastic resin composition according to the present invention has superior fluidity, impact strength and heat resistance and enhances moldability.

BEST MODE

A polycarbonate based thermoplastic resin composition according to the present invention has superior fluidity, impact strength and heat resistance, and enhances moldability.

The polycarbonate based thermoplastic resin composition according to the present invention comprises (A) a polycarbonate resin, (B) a rubber-modified acrylic graft copolymer resin and (C) a copolymer resin comprising a silicone-based compound. Hereinafter, each ingredient therefor is described in detail.

In addition, the polycarbonate based thermoplastic resin composition according to the present invention comprises (A) a continuous-phase first resin, (C) a dispersed-phase second resin and (B) an impact modifier located in an interface between the continuous-phase first resin and the dispersed-phase second resin. Hereinafter, each ingredient thereof is described in detail below.

Polycarbonate Based Thermoplastic Resin Composition

The polycarbonate based thermoplastic resin composition according to the present invention may comprise (A) about 40 to about 80% by weight of the polycarbonate resin, (B) about 1 to about 30% by weight of the rubber-modified acrylic graft copolymer resin and (C) about 10 to about 30% by weight of the copolymer resin comprising the silicone-based compound.

In addition, the polycarbonate based thermoplastic resin composition according to the present invention comprises (A) about 40 to about 80% by weight of the continuous-phase first resin, (C) about 10 to about 30% by weight of the dispersed-phase second resin and (B) about 1 to about 30% by weight of the impact modifier located in an interface between the continuous-phase first resin and the dispersed-phase second resin. Each ingredient therefor is described in detail.

(A) Polycarbonate Resin

In the present invention, the polycarbonate resin (A) is not specifically limited. For example, as the polycarbonate resin, an aliphatic polycarbonate resin, an aromatic polycarbonate resin, copolycarbonate thereof, a copolyester carbonate resin, a polycarbonate-polysiloxane copolymer or a combination thereof may be used. In addition, the polycarbonate resin may have a linear or branched structure.

In the present invention, the polycarbonate resin is a continuous phase in the polycarbonate based thermoplastic resin composition.

In the present invention, the polycarbonate resin (A) may be prepared by reacting diphenols represented by Formula 1 below with a compound selected from the group consisting of phosgene, halogen formate, carbonate and a combination thereof.

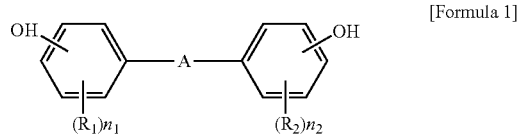

[Formula 1]

wherein A is a connecting group selected from the group consisting of single-bound, substituted or unsubstituted $C_1$ to $C_{20}$ alkylene, substituted or unsubstituted $C_1$ to $C_{20}$ alkylidene, substituted or unsubstituted $C_1$ to $C_{20}$ cycloalkylene, substituted or unsubstituted $C_1$ to $C_5$ cycloalkylidene, CO, S and $SO_2$, $R_1$ and $R_2$ are each independently a substituent selected from the group consisting of substituted or unsubstituted $C_1$ to $C_{30}$ alkyl and substituted or unsubstituted $C_6$ to $C_{30}$ aryl, and ni and nz are each independently an integer of 0 to 4. The term "substituted" means that hydrogen is substituted with a substituent selected from the group consisting of halogen, $C_1$ to $C_{30}$ alkyl, $C_1$ to $C_{30}$ haloalkyl, $C_6$ to $C_{30}$ aryl, $C_1$ to $C_{20}$ alkoxy and a combination thereof.

Diphenols represented by Formula 1 may constitute a repeated polycarbonate resin unit through combination of two or more diphenols. Specific embodiments of the diphenols comprise hydroquinone, resorcinol, 4,4'-dihydroxydiphenyl, 2,2-bis-(4-hydroxyphenyl)-propane (also referred to as "bisphenol-A"), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, etc. Among the diphenols, 2,2-bis-(4-hydroxyphenyl)-propane, 2,2-bis-(3,5-dichloro-4-hydroxyphenyl)-propane or 1,1-bis-(4-hydroxyphenyl)-cyclohexane may be preferably used. In addition, 2,2-bis-(4-hydroxyphenyl)-propane may be more preferably used.

The weight-average molecular weight of the polycarbonate resin (A) is preferably about 10,000 to about 200,000 g/mol, more preferably about 15,000 to about 80,000 g/mol. Within the molecular weight ranges, superior impact strength and processability may be secured through proper fluidity.

The polycarbonate resin (A) may be a mixture of copolymers prepared from two or more diphenols. In addition, as the polycarbonate resin (A), a linear polycarbonate resin, a branched polycarbonate resin, a polyester carbonate copolymer resin, etc may be used. As the linear polycarbonate resin, a bisphenol-A based polycarbonate resin, etc may be used. The branched polycarbonate resin may be prepared by reacting a multifunctional aromatic compound such as trimellitic anhydride, trimellitic acid, etc. with diphenols and carbonate. The multifunctional aromatic compound may be preferably comprised in an amount of 0.05 to 2 mol % based on the total amount of the branched polycarbonate resin. The polyester carbonate copolymer resin may be prepared by reacting difunctional carboxylic acid with diphenols and carbonate. Here, as the carbonate, diaryl carbonate such as diphenyl carbonate, cyclic ethylene carbonate, etc. may be used.

The polycarbonate resin (A) may be comprised in an amount of about 40 to about 80% by weight based on 100% by weight of total resin compositions comprising the polycarbonate resin (A), the rubber-modified acrylic graft copolymer resin (B) and the copolymer resin comprising the silicone-based compound (C).

When the amount of the polycarbonate resin (A) is less than about 40% by weight, impact resistance, tensile strength and heat resistance are decreased. When the amount of the polycarbonate resin (A) is greater than about 80% by weight, fluidity is decreased.

(B) Rubber-Modified Acrylic Graft Copolymer Resin

The rubber-modified acrylic graft copolymer resin (B) of the present invention is an impact modifier and is a copolymer formed by grafting rubber (b1), alkyl methacrylate (b2) and vinyl based aromatic monomer (b3). The rubber-modified acrylic graft copolymer resin (B) may comprise about 40 to about 98% by weight of rubber (b1), about 1 to about 30% by weight of alkyl methacrylate (b2) and about 1 to about 40% by weight of a vinyl based aromatic monomer (b3).

Non-limiting embodiments of the rubber (b1) comprise diene based rubber such as polybutadiene, poly(styrenebutadiene) and poly(acrylonitrile-butadiene), saturated rubber formed by adding hydrogen to the diene based rubber, isoprene rubber, chloroprene rubber, acrylic rubber such as poly acrylic acid butyl, ethylene-propylene rubber, and ethylene-propylene-diene monomer (EPDM). The rubber (b1) may be used alone or as a mixture of two or more types thereof. Thereamong, the diene based rubber is preferable and the butadiene based rubber is more preferable. The content of the rubber (b1) is properly about 40 to about 98% by weight based on the total weight of the rubber-modified acrylic graft copolymer resin (B). When the content of the rubber (b1) is less than about 40% by weight, impact resistance is decreased. When the content of the rubber (b1) is greater than about 98% by weight, heat resistance is decreased. The content of the rubber (b1) is preferably about 60 to about 80% by weight. When impact strength and appearance are considered, an average particle size of the rubber (b1) is preferably about 0.1 to about 0.7 µm.

In the present invention, the rubber-modified acrylic graft copolymer resin (B) is used as an impact modifier, and locates in an interface between the continuous-phase polycarbonate resin (first resin) and the dispersed-phase copolymer resin comprising the silicone-based compound (second resin).

In conventional polycarbonate based resin compositions (for example, PC/SAN alloy), a g-ABS resin as an impact modifier was used. Since the g-ABS resin has high affinity to the SAN, the g-ABS resin is present within the SAN, and, when external impact is applied, an interface between the PC and the SAN is firstly, mainly destroyed, thereby decreasing impact reinforcing effects.

However, the rubber-modified acrylic graft copolymer resin (B) used as an impact modifier in the present invention has affinity similar to polycarbonate (A) and the copolymer resin comprising the silicone-based compound (C). That is, affinity of polycarbonate (A) and the rubber-modified acrylic graft copolymer resin (B) is similar to affinity of the rubber-modified acrylic graft copolymer resin (B) and the copolymer resin comprising the silicone-based compound (C). Accordingly, the rubber-modified acrylic graft copolymer resin (B) locates in an interface between the continuous-phase polycarbonate resin (first resin) and the dispersed-phase copolymer resin comprising a silicone-based compound (second resin), and thus, it is prevented that the interface is firstly, mainly destroyed upon application of external impact. Accordingly, the polycarbonate based resin composition according to the present invention exhibits superior impact-reinforcing effects.

As alkyl methacrylate (b2), $C_1$ to $C_{20}$ alkyl methacrylate may be used.

Examples of the alkyl methacrylate comprise methyl methacrylate, ethyl methacrylate, butyl methacrylate and 2-ethylhexyl methacrylate, but the present invention is not limited thereto. The alkyl methacrylate may be used alone or as a mixture of two or more thereof. Thereamong, methyl methacrylate is most preferable. The content of alkyl methacrylate may be about 1 to about 30% by weight, preferably about 5 to about 15% by weight based on the total weight of the rubber-modified acrylic graft copolymer resin (B). When the content of alkyl methacrylate is less than about 1% by weight, dispersibility is decreased. When the content of alkyl methacrylate is greater than about 30% by weight, impact resistance may be decreased.

As the vinyl based aromatic monomer (b3), styrene, α-methylstyrene, p-methylstyrene, vinyltoluene, 2,4-dimethylstyrene, halogen, alkyl-substituted styrene, or a combination thereof may be used. Preferably, styrene is used, but the present invention is not limited thereto. The vinyl based aromatic monomer (b3) may be comprised in an amount of about 1 to about 40% by weight, preferably about 10 to about 30% by weight based of the total weight of the rubber-modified acrylic graft copolymer resin (B). When the content of the vinyl based aromatic monomer (b3) is less than about 1% by weight, polymerization properties are decreased. When the content of the vinyl based aromatic monomer (b3) is greater than about 40% by weight, gloss may be decreased.

The rubber-modified acrylic graft copolymer resin (B) may be comprised in an amount of about 1 to about 30%, preferably about 5 to about 15% by weight based on 100% by weight of total resin compositions comprising the polycarbonate resin (A), the rubber-modified acrylic graft copolymer resin (B) and the copolymer resin comprising the silicone-based compound (C).

When the content of the rubber-modified acrylic graft copolymer resin (B) is less than about 1% by weight, impact resistance and flexural strength are decreased. When the content of the rubber-modified acrylic graft copolymer resin (B) is greater than about 30% by weight, fluidity and heat resistance are decreased.

(C) Copolymer Resin Comprising a Silicone-Based Compound

As the copolymer resin comprising the silicone-based compound (C) of the present invention, a flexible branched vinyl based copolymer resin may be used.

In the present invention, the copolymer resin comprising the silicone-based compound may be a dispersed phase in the polycarbonate based thermoplastic resin composition.

In the present invention, the copolymer resin comprising the silicone-based compound (C) may be a copolymer prepared by copolymerizing (c1) an aromatic vinyl based monomer, (c2) an unsaturated nitrile based monomer, (c3) a (meth)acrylic monomer and (c4) a silicone-based compound having two or more unsaturated reactive groups, or a combination thereof.

In the present invention, the copolymer resin comprising the silicone-based compound (C) may be a copolymer prepared by copolymerizing about 10 to about 80% by weight of an aromatic vinyl based monomer (c1), about 10 to about 80% by weight of an unsaturated nitrile based monomer (c2), about 1 to about 30% by weight of a (meth)acrylic monomer (c3) and about 0.1 to about 25% by weight of a silicone-based compound (c4) having two or more unsaturated reactive groups, or a combination thereof.

The copolymer resin comprising the silicone-based compound (C) may be prepared according to a conventional polymerization method publicly known in the art, such as mass polymerization, emulsion polymerization or suspension polymerization.

The copolymer resin comprising the silicone-based compound (C) has a low impurity content, thus exhibiting superior stability. Since the copolymer resin comprising the silicone-based compound (C) is prepared according to a simple suspension polymerization process, production costs are low.

The copolymer resin comprising the silicone-based compound (C) of the present invention forms a branched structure, which may enhance fluidity, with the silicone-based compound that has a high molecular weight and may enhance impact strength of a resin upon copolymerization.

Since the copolymer resin comprising the silicone-based compound (C) is a material having a low glass transition temperature (Tg) (for example, butylacrylate and a silicone cross-linking agent), it is easily dissolved in and mixed with other engineering plastics. Accordingly, physical properties such as fluidity of a product are enhanced.

As the aromatic vinyl based monomer (c1), styrene, p-methylstyrene, α-methylstyrene, halogen, alkyl-substituted styrene, or a combination thereof may be used. Styrene is preferably used, but the present invention is not limited thereto. The aromatic vinyl based monomer (c1) is comprised in an amount of preferably about 10 to about 80% by weight, more preferably about 50 to about 70% by weight based on 100% by weight of the copolymer resin comprising the silicone based compound (C).

As the unsaturated nitrile based monomer (c2), acrylonitrile, methacrylonitrile, ethacrylonitrile, phenylacrylonitrile, α-chloroacrylonitrile, or a combination thereof may be used. Preferably, acrylonitrile is used, but the present invention is not limited thereto. The unsaturated nitrile based monomer (c2) may be comprised in an amount of preferably about 10 to about 80% by weight, more preferably about 20 to about 50% by weight based on 100% by weight of the copolymer resin comprising the silicone-based compound (C).

Preferably, the (meth)acrylic monomer (c3) may comprise aromatic or aliphatic methacrylate having a structure represented by Formulas 2 and 3 below.

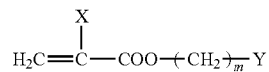

[Formula 2]

wherein m is an integer of 0 to 20, X is hydrogen or methyl, and Y may be selected from the group consisting of methyl, cyclohexyl, phenyl, benzyl, methylphenyl, methylethylphenyl, methoxyphenyl, cyclohexylphenyl, chlorophenyl, bromophenyl, phenylphenyl and benzylphenyl.

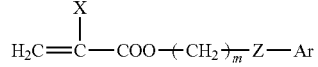

[Formula 3]

wherein m is an integer of 0 to 20, X is hydrogen or methyl, Z is oxygen (O) or sulfur (S), and Ar may be selected from the group consisting of phenyl, methylphenyl, methylethylphenyl, methoxyphenyl, cyclohexylphenyl, chlorophenyl, bromophenyl, phenylphenyl and benzylphenyl.

Examples of aromatic methacrylate or aliphatic methacrylate comprising the structure of Formula 2 or 3 comprises cyclohexyl methacrylate, phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate and 2-(4-benzylphenyl) ethyl methacrylate.

In addition, as another embodiment of the (meth)acrylic monomer (c3), methacrylic acid ester, acrylic acid ester, unsaturated carboxylic acid, acid anhydride, esters comprising a hydroxyl group, etc. may be used alone or as a combination of two or more thereof. In particular, methacrylic acid esters comprising methyl methacrylate, ethyl methacrylate, propyl methacrylate, butyl methacrylate, hexyl methacrylate, 2-ethylhexyl methacrylate and benzyl methacrylate; acrylic acid esters comprising methyl acrylate, ethyl acrylate, propyl acrylate, butyl acrylate, hexyl acrylate, 2-ethylhexyl acrylate, cyclohexyl methacrylate, phenyl methacrylate and benzyl methacrylate; unsaturated carboxylic acids comprising acrylic acid and methacrylic acid; acid anhydrides comprising maleic anhydride; esters comprising 2-hydroxyethyl acrylate, 2-hydroxypropyl acrylate and comprising monoglycerol acrylate and containing a hydroxyl group; or a combination thereof may be used.

The (meth)acrylic monomer (c3) is comprised in an amount of preferably about 1 to about 30% by weight, more preferably 5 to 20% by weight based on 100% by weight of the copolymer resin comprising the silicone-based compound (C).

When the content of the (meth)acrylic monomer (c3) is less than about 1% by weight, fluidity is slightly enhanced. When the content of the (meth)acrylic monomer (c3) is greater than about 30% by weight, heat resistance of a resin may be decreased.

The silicone-based compound having two or more unsaturated reactive groups (c4) may comprise one or a mixture comprising two or more of silicone-based compound types having a structure represented by Formula 4 below. In the present invention, the silicone-based compound functions as a cross-linking agent in the copolymer resin.

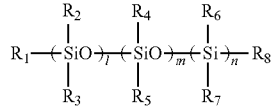

[Formula 4]

wherein l, m and n are each an integer of 0 to 100 (at least one of l, m and n is not 0), and $R_1$ to $R_8$ are each independently selected from the group consisting of hydrogen, linear or branched $C_1$-$C_5$ alkyl, $C_4$-$C_6$ cycloalkyl, unsaturated $C_2$-$C_{12}$ alkyl, $C_6$-$C_{10}$ aryl, a hydroxyl group, $C_1$-$C_5$ alkoxy, acetoxyl, amino, amide, epoxy, carboxyl, halogen, ester, isocyanate and mercapto, wherein at least two of $R_1$ to $R_8$ comprises a polymerizable unsaturated reactive group.

Specific examples of the silicone-based compound having two or more unsaturated reactive groups (c4) comprise dimethoxymethylvinylsilane, diethoxymethylvinylsilane, diacetoxy methylvinylsilane, 1,1,1,3,5,5,5,-heptamethyl-3-vinyltrisiloxane, 2,4,6,8-tetramethyl tetravinyl cyclotetrasiloxane, α,ω-divinyl polydimethylsiloxane and vinyl-modified dimethylsiloxane, 1,3,5-trivinyl-1,1,3,5,5-pentamethyltrisiloxane, 2,4,6-trivinyl-1,3,5-trimethylcyclosilazane, polyvinylmethylsilazane, and 1,3-divinyl-1,1,3,3-tetramethyldisiloxane, but the present invention is not limited thereto. The listed compounds may be used alone or as a combination thereof.

The silicone-based compound having two or more unsaturated reactive groups (c4) functions as a cross-linking agent and comprises vinyl in an amount of about 0.05 to about 10 mmol/g.

The silicone-based compound having two or more unsaturated reactive groups (c4) is comprised in an amount of preferably about 0.1 to about 25% by weight, more preferably 1 to 10% by weight based on 100% by weight of the copolymer resin comprising the silicone-based compound (C).

When the content of the silicone-based compound having two or more unsaturated reactive groups (c4) is 1 to 25% by weight, impact resistance and fluidity are simultaneously enhanced.

In addition, the silicone-based compound having two or more unsaturated reactive groups (c4) has a viscosity of about 5,000 cPs or less, particularly about 0.001 to about 5000 cPs. In addition, the silicone-based compound having two or more unsaturated reactive groups (c4) preferably comprises vinyl in an amount of about 0.05 to about 10 mmol/g. More preferably, the silicone-based compound having two or more unsaturated reactive groups (c4) has a viscosity of about 0.5 to about 3,000 cPs and comprises vinyl in an amount of about 0.1 to about 5 mmol/g.

When the copolymer resin comprising the silicone-based compound (C) according to the present invention comprises about 10 to about 80% by weight of the aromatic vinyl based monomer (c1), about 10 to about 80% by weight of the unsaturated nitrile based monomer (c2), about 1 to about 30% by weight of the (meth)acrylic monomer (c3) and about 0.1 to about 25% by weight of the silicone-based compound (c4) having two or more unsaturated reactive groups, impact resistance and fluidity of the polycarbonate based resin may be simultaneously enhanced without decrease of heat resistance.

The copolymer resin comprising the silicone-based compound (C) has a weight-average molecular weight of preferably about 30,000 to about 800,000 g/mol. When the copolymer resin comprising the silicone-based compound (C) has such a molecular weight range, fluidity and impact resistance of a thermoplastic resin may be simultaneously enhanced while maintaining exhisting superior properties thereof.

The copolymer resin comprising the silicone-based compound (C) may be comprised in an amount of about 10 to about 30% by weight based on 100% by weight of total resin compositions comprising (A) the polycarbonate resin, (B) the rubber-modified acrylic graft copolymer resin and (C) the copolymer resin comprising the silicone-based compound.

When the content of the copolymer resin comprising the silicone-based compound (C) is less than about 10% by weight, sufficient impact strength and fluidity enhancement effects might not be obtained. When the content of the copolymer resin comprising the silicone-based compound (C) is about 30% by weight or more, impact strength and fluidity may be decreased.

When, in the polycarbonate based thermoplastic resin composition according to the present invention, the copolymer resin comprising the silicone-based compound is added to particularly a blend comprising the polycarbonate resin (A) and the rubber-modified acrylic graft copolymer resin (g-ASA), impact strength and fluidity are simultaneously enhanced.

(D) Additives

The polycarbonate based thermoplastic resin composition according to the present invention may further comprise an additive (D), depending upon use thereof. The polycarbonate based thermoplastic resin composition may further comprise a surfactant, a nucleating agent, a coupling agents, a filler, a plasticizer, an impact modifier, a lubricant, an antimicrobial agent, a release agent, thermostabilizer, an antioxidant, a light stabilizer, a compatibilizer, an inorganic additive, a coloring agent, a stabilizer, a lubricant, an antistatic agent, a pigment, a dye, a flame proofing agent or a combination thereof as an additive (D), but the present invention is not limited thereto.

The polycarbonate based thermoplastic resin composition according to the present invention may be prepared by publicly known methods used to prepare a resin composition. For example, constituents and other additives of the present invention are simultaneously mixed, and then may be prepared in a pellet or chip type through melt extrusion in an extruder.

The polycarbonate based thermoplastic resin composition according to the present invention may be prepared into a molded resin article according to publicly known resin preparation methods. For example, constituents and other additives of the present invention are simultaneously mixed and then may be pelletized through melt extrusion in an extruder. In addition, a molded article may be prepared through plastic injection or compression using such a pellet. Molding methods are not specifically limited and examples thereof comprise extrusion molding, injection molding and calendar molding, vacuum molding.

The polycarbonate based thermoplastic resin composition according to the present invention may be usefully used in a variety of products through molding. In particular, the polycarbonate based thermoplastic resin composition may be broadly used in a variety of fields using parts simultaneously requiring heat resistance and impact resistance such as a variety of electric or electronic exterior materials, components or vehicle components, lenses or glass windows. For example, the polycarbonate based thermoplastic resin composition may be used in manufacturing vehicle components or exterior materials, and housings of electric and electronic products such as TVs, washing machines, cassette players, MP3 players, digital multimedia broadcasting (DMB) devices, navigation systems, cellular phones, phones, game machines, audio devices, computers, printers and copiers.

Molded Article

The present invention also provides a molded article manufactured from the polycarbonate based thermoplastic resin composition. A method of molding the molded article is not specifically limited, and examples thereof comprise extrusion molding, injection molding and cast molding. Such molding may be easily carried by ordinary skilled persons in the art.

A ⅛" thickness specimen of the molded article of the present invention has an Izod impact strength of about 23.00 to about 90.00 kgfcm/cm measured according to ASTM D256. For example, the ⅛" thickness specimen of the molded article has an Izod Notch impact strength of about 23.02 kgf·cm/cm, about 34.10 kgf·cm/cm, about 57.68 kgf·cm/cm, about 58.0 kgf·cm/cm, about 64.53 kgf·cm/cm or about 65.17 kgf·cm/cm as measured according to ASTM D256.

A melt index (MI), which is measured under conditions such as 220° C. and a load of 10 kg according to ASTM D1238, of the molded article of the present invention is about 34.00 to about 80.00 g/10 min. For example, the melt index (MI), which is measured under conditions such as 220° C. and a load of 10 kg according to ASTM D1238, of the molded article is about 55.8 g/10 min, about 45.6 g/10 min, about 40.2 g/10 min, about 38.4 g/10 min, about 35.4 g/10 min or about 34.2 g/10 min.

A ¼" thickness specimen of the molded article of the present invention has a flexural strength of about 810 to about 840 kgf/cm$^2$ as measured according to ASTM D790. For example, the ¼" thickness specimen of the molded article of the present invention has a flexural strength of about 816 kgf/cm$^2$, about 828 kgf/cm$^2$, about 814 kgf/cm$^2$, about 836 kgf/cm$^2$, about 823 kgf/cm$^2$ or about 835 kgf/cm$^2$ measured according to ASTM D790.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Mode for Invention]

EXAMPLES AND COMPARATIVE EXAMPLES

Each constituent used in Examples and Comparative Examples is as follows.

(A) Polycarbonate Resin 2,2-bis-(4-hydroxyphenyl)-propane (bisphenol-A) having a weight-average molecular weight of about 30,000 g/mol based on linear carbonate from Cheil Industries was used.

(B) Rubber-Modified Acrylic Graft Copolymer Resin

Metable C-223A from Mitsubishi Rayon Corporate was used.

(C) Copolymer Resin Comprising Silicone-Based Compound (C1) Copolymer Resin Comprising Silicone-Based Compound Using about 58.22% by weight of styrene, about 23.78% by weight of acrylonitrile, about 15% by weight of butylacrylate and about 3% by weight of a vinyl-modified dimethyl siloxane compound having a viscosity of about 100 cPs and comprising about 0.5 mmol/g of vinyl, a copolymer resin comprising a silicone-based compound having a weight-average molecular weight of about 90,000 g/mol prepared according to conventional suspension polymerization was used.

(C2) Copolymer Resin Comprising Silicone-Based Compound

The same copolymer resin comprising a silicone-based compound as in (C1) was used, except that the weight-average molecular weight was about 110,000 g/mol.

(C3) Copolymer Resin Comprising Silicone-Based Compound

The same copolymer resin comprising a silicone-based compound as in (C1) was used, except that the weight-average molecular weight was about 150,000 g/mol.

(C4) Copolymer Resin Comprising Silicone-Based Compound

The same copolymer resin comprising a silicone-based compound as in (C1) was used, except that the weight-average molecular weight was about 190,000 g/mol.

(C5) Copolymer Resin Comprising Silicone-Based Compound

The same copolymer resin comprising a silicone-based compound as in (C1) was used, except that the weight-average molecular weight was about 250,000 g/mol.

(C6) Copolymer Resin Comprising Silicone-Based Compound

The same copolymer resin comprising a silicone-based compound as in (C1) was used, except that the weight-average molecular weight was about 335,000 g/mol.

(C7) Linear Aromatic Vinyl Based Copolymer Resin

Using about 75% by weight of styrene and about 25% by weight of acrylonitrile, a styrene-acrylonitrile copolymer resin (SAN resin) having a weight-average molecular weight of about 90,000 g/mol polymerized at 75° C. for five hours according to conventional suspension polymerization was used.

(C8) Linear Aromatic Vinyl Based Copolymer Resin

Using about 71% by weight of styrene and about 29% by weight of acrylonitrile, a styrene-acrylonitrile copolymer resin (SAN resin) having a weight-average molecular weight of about 115,000 g/mol polymerized at 75° C. for five hours according to conventional suspension polymerization was used.

(C9) Linear Aromatic Vinyl Based Copolymer Resin

Using about 60.35% by weight of styrene and about 24.65% by weight of acrylonitrile and about 15% by weight of butylacrylate, a copolymer resin having a weight-average molecular weight of about 90,000 g/mol polymerized at 75° C. for five hours according to conventional suspension polymerization was used.

(C10) Branched Aromatic Vinyl Based Copolymer Resin

Using about 68.87% by weight of styrene, about 28.13% by weight of acrylonitrile and about 3% by weight of a vinyl-modified dimethyl siloxane compound having a viscosity of about 100 cps and comprising about 0.5 mmol/g of vinyl, a branched vinyl based copolymer resin having a weight-average molecular weight of about 90,000 g/mol prepared according to a conventional suspension polymerization was used.

Examples 1 to 6 and Comparative Examples 1 to 4

Each ingredient was added according to compositions of Table 1 below and then a pellet was prepared through melting, kneading and extrusion. Here, extrusion was carried out using a twin-screw extruder having L/D=29 and a diameter of 45 mm. The prepared pellet was dried at 70° C. for six hours and then was injected in a 6 oz injection machine, thereby preparing a specimen for property evaluation.

In [Table 1] below, a mix ratio of (A), (B) and (C) is represented by "% by weight" based on 100% by weight of a mixture comprising (A), (B) and (C).

TABLE 1

| Classification | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| A | | 75 | 75 | 75 | 75 | 75 | 75 | 75 | 75 | 75 | 75 |
| B | | 9 | 9 | 9 | 9 | 9 | 9 | 9 | 9 | 9 | 9 |
| C | C1 | 16 | — | — | — | — | — | — | — | — | — |
| | C2 | — | 16 | — | — | — | — | — | — | — | — |
| | C3 | — | — | 16 | — | — | — | — | — | — | — |
| | C4 | — | — | — | 16 | — | — | — | — | — | — |
| | C5 | — | — | — | — | 16 | — | — | — | — | — |
| | C6 | — | — | — | — | — | 16 | — | — | — | — |
| | C7 | — | — | — | — | — | — | 16 | — | — | — |
| | C8 | — | — | — | — | — | — | — | 16 | — | — |
| | C9 | — | — | — | — | — | — | — | — | 16 | — |
| | C10 | — | — | — | — | — | — | — | — | — | 16 |

Properties of the prepared specimen were measured according to methods below, and results are summarized in Table 2 below.

(1) Impact strength (kgf·cm/cm): Evaluated by preparing Notch in a ⅛" Izod specimen according to an evaluation method regulated in ASTM D256.

(2) Melt flow index (g/10 minute): Measured under conditions of 220° C. and 10 kg according to an evaluation method regulated in ASTM D1238.

(3) Flexural strength: Measured in a ¼" thickness specimen according to an evaluation method regulated in ASTM D790.

(4) Heat distortion temperature (HDT): Measured according to ASTM D648 (¼ inches, 18.6 kgf/cm² and 120° C./hr).

TABLE 2

| Classification | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| Impact strength (Kgf · cm/cm) | 23.02 | 34.10 | 57.68 | 58.0 | 64.53 | 65.17 | 36.26 | 57.28 | 24.50 | 44.63 |
| Melt flow index (g/10 min) | 55.8 | 45.6 | 40.2 | 38.4 | 35.4 | 34.2 | 34.2 | 30.6 | 43.8 | 31.8 |
| Flexural Strength | 816 | 828 | 814 | 836 | 823 | 835 | 841 | 817 | 819 | 820 |
| HDT | 77.0 | 78.7 | 76.4 | 77.2 | 78.3 | 78.8 | 76.5 | 78.8 | 74.1 | 79.6 |

As shown in [Table 2], it can be confirmed that, in Examples 1 to 6, impact strength is enhanced due to increased molecular weight and the silicone-based compound, and fluidity is enhanced due to the flexible butyl acrylate monomer having a branched structure and low glass transition temperature (Tg), thereby exhibiting enhanced moldability.

In Examples 1 and 2, the molecular weight of the copolymer (C) decreases and superior fluidity is exhibited by using a monomer (butyl acrylate and a silicone-based compound) having low glass transition temperature (Tg). However, impact strength was slightly decreased.

In Examples 3 and 4, by using the flexible branched vinyl based copolymer in a proper molecular weight, impact strength and fluidity are enhanced.

In Examples 5 and 6, superior impact strength and relatively higher fluidity are exhibited by using a branched copolymer having a high molecular weight.

In Comparative Example 2, impact strength is enhanced by using a high molecular weight SAN resin having a large content of acrylonitrile, but fluidity and flexural properties are rapidly decreased.

In Comparative Example 3, since the butyl acrylate monomer having a low glass transition temperature (Tg) was used without use of the silicone-based compound having two or more unsaturated reactive groups (c4). Accordingly, fluidity is enhanced but impact strength is decreased.

In Comparative Example 4, the silicone-based compound having two or more unsaturated reactive groups was used as a cross-linking agent, and thus, impact strength is enhanced, but fluidity is decreased due to absence of the (meth)acrylic monomer (c3).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polycarbonate based thermoplastic resin composition comprising:
    a continuous-phase first resin;
    a dispersed-phase second resin; and
    an impact modifier located in an interface between the continuous-phase first resin and the dispersed-phase second resin, wherein:
    the continuous-phase first resin is (A) a polycarbonate resin;
    the dispersed-phase second resin is (C) a copolymer resin comprising a silicone-based compound; and
    the impact modifier is (B) a rubber-modified acrylic graft copolymer resin.

2. The polycarbonate based thermoplastic resin composition according to claim 1, comprising the polycarbonate resin (A) in an amount of about 40 to about 80% by weight, the rubber-modified acrylic graft copolymer resin (B) in an amount of about 1 to about 30% by weight, and the copolymer resin comprising a silicone-based compound (C) in an amount of about 10 to about 30%.

3. The polycarbonate based thermoplastic resin composition according to claim 1, wherein the rubber-modified acrylic graft copolymer resin (B) comprises about 40 to about 98% by weight of rubber (b1), about 1 to about 30% by weight of alkyl methacrylate (b2) and about 1 to about 40% by weight of a vinyl based aromatic monomer (b3).

4. The polycarbonate based thermoplastic resin composition according to claim 3, wherein the alkyl methacrylate (b2) is $C_1$ to $C_{20}$ alkyl methacrylate.

5. The polycarbonate based thermoplastic resin composition according to claim 1, wherein the copolymer resin comprising the silicone-based compound (C) is a branched vinyl-based copolymer resin.

6. The polycarbonate based thermoplastic resin composition according to claim 1, wherein the copolymer resin comprising the silicone-based compound (C) is prepared by copolymerizing about 10 to about 80% by weight of an aromatic vinyl based monomer (c1), about 10 to about 80% by weight of an unsaturated nitrile based monomer (c2), about 1 to about 30% by weight of a (meth)acrylic monomer (c3) and about 0.1 to about 25% by weight of a silicone-based compound (c4) having two or more unsaturated reactive groups.

7. The polycarbonate based thermoplastic resin composition according to claim 1, wherein the copolymer resin comprising the silicone-based compound (C) has a weight-average molecular weight of about 30,000 to about 800,000 g/mol.

8. The polycarbonate based thermoplastic resin composition according to claim 6, wherein the aromatic vinyl based monomer (c1) is selected from the group consisting of styrene, p-methylstyrene, α-methylstyrene, halogen-substituted styrene, alkyl-substituted styrene and combinations thereof,
    the unsaturated nitrile based monomer (c2) is selected from the group consisting of acrylonitrile, methacrylonitrile, ethacrylonitrile, phenylacrylonitrile, α-chloroacrylonitrile and combinations thereof,
    the (meth)acrylic monomer (c3) is selected from the group consisting of methyl (meth)acrylate, ethyl (meth)acrylate, propyl (meth)acrylate, butyl (meth)acrylate, hexyl (meth)acrylate, 2-ethylhexyl (meth)acrylate and combinations thereof, and
    the silicone-based compound (c4) comprising the two or more unsaturated reactive groups comprises one silicone-based compound type or a combination of two or more silicone-based compound types having a structure represented by Formula 4 below:

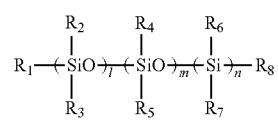

[Formula 4]

wherein l, m and n are each an integer of 0 to 100 with the proviso that at least one of l, m and n is not 0, and $R_1$ to $R_8$ are each independently selected from the group consisting of hydrogen, linear or branched $C_1$-$C_5$ alkyl, $C_4$-$C_6$ cycloalkyl, unsaturated $C_2$-$C_{12}$ alkyl, $C_6$-$C_{10}$ aryl, a hydroxyl group, $C_1$-$C_5$ alkoxy, acetoxyl, amino, amide, epoxy, carboxyl, halogen, ester, isocyanate and mercapto, wherein at least two of the $R_1$ to $R_8$ comprises a polymerizable unsaturated reactive group.

9. The polycarbonate based thermoplastic resin composition according to claim 6, wherein the silicone-based compound (c4) comprising the two or more unsaturated reactive groups has a viscosity of about 5000 cPs or less and a vinyl content of about 0.05 to about 10 mmol/g.

10. The polycarbonate based thermoplastic resin composition according to claim 6, wherein the silicone-based compound (c4) comprising the two or more unsaturated reactive groups is selected from the group consisting of 2,4,6,8-tetramethyl tetravinyl cyclotetrasiloxane, 1,3,5-trivinyl-1,1,3,5,5-pentamethyltrisiloxane, 2,4,6-trivinyl-1,3,5-trimethylcyclosilazane, polydimethylsiloxane, polyvinylmethylsilazane, 1,3-divinyl-1,1,3,3-tetramethyldisiloxane and combinations thereof.

11. A molded article manufactured from the polycarbonate based thermoplastic resin composition according to claim 1.

12. The polycarbonate based thermoplastic resin composition according to claim 1, wherein a molded article formed of the composition has an Izod impact strength of about 23 to about 90 kgf·cm/cm measured in accordance with ASTM D256 (1/8" thickness, notched), a melt index (MI) of about 34 to about 80 g/10 min measured in accordance with ASTM D1238, and a flexural strength of about 810 to about 840 kgf/cm² measured in accordance with ASTM D790 (1/4" thickness).

* * * * *

UNITED STATES PATENT AND TRADEMARK OFFICE
CERTIFICATE OF CORRECTION

PATENT NO. : 9,505,929 B2
APPLICATION NO. : 14/763877
DATED : November 29, 2016
INVENTOR(S) : Senthilkumar Natarajan et al.

It is certified that error appears in the above-identified patent and that said Letters Patent is hereby corrected as shown below:

In the Specification

Column 3, delete Line 53 and insert: -- ane, 2,4,6-trivinyl-1,3,5-trimethylcyclosilazane, α,ω-divinyl polydim- --

Column 5, delete Line 3 and insert: -- tuted $C_6$ to $C_{30}$ aryl, and $n_1$ and $n_2$ are each independently an --

In the Claims

Column 16, Claim 10 delete Line 60 and insert: -- trimethylcyclosilazane, α,ω-divinyl polydimethylsiloxane, polyvinylm- --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*